US008412230B2

(12) United States Patent
Nylander et al.

(10) Patent No.: US 8,412,230 B2
(45) Date of Patent: Apr. 2, 2013

(54) CONFIGURING RELATIONS BETWEEN CELLS IN DIFFERENT RADIO ACCESS NETWORKS

(75) Inventors: Tomas Nylander, Värmdö (SE); Magnus Hallenstäl, Täby (SE); Jari Vikberg, Jarna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/145,232

(22) PCT Filed: Jan. 22, 2010

(86) PCT No.: PCT/SE2010/050061
§ 371 (c)(1),
(2), (4) Date: Sep. 22, 2011

(87) PCT Pub. No.: WO2010/085208
PCT Pub. Date: Jul. 29, 2010

(65) Prior Publication Data
US 2012/0003974 A1    Jan. 5, 2012

Related U.S. Application Data

(60) Provisional application No. 61/146,792, filed on Jan. 23, 2009.

(51) Int. Cl.
*H04W 4/00* (2009.01)
(52) U.S. Cl. ............... 455/456.1; 455/432.1; 455/435.2; 370/352; 370/254
(58) Field of Classification Search .......... 455/1, 456.1, 455/432.1, 435.2; 370/352, 254
See application file for complete search history.

(56) References Cited

U.S. PATENT DOCUMENTS

| 7,920,549 | B2 * | 4/2011 | Alt et al. ........................ 370/352 |
| 2005/0202780 | A1 * | 9/2005 | Kall et al. ......................... 455/1 |
| 2007/0041360 | A1 * | 2/2007 | Gallagher et al. ............. 370/352 |
| 2007/0207815 | A1 * | 9/2007 | Alfano et al. ............... 455/456.1 |
| 2008/0076412 | A1 * | 3/2008 | Khetawat et al. .......... 455/432.1 |
| 2009/0268635 | A1 * | 10/2009 | Gallagher et al. ............ 370/254 |

OTHER PUBLICATIONS

3rd Generation Partnership Project. "Addition of an Alternative to CS over PS." 3GPP TSG SA WG2 Meeting #69, TD S2-087575, Miami, Florida, US, Nov. 17-21, 2008.

(Continued)

*Primary Examiner* — Charles Shedrick
(74) *Attorney, Agent, or Firm* — Coats & Bennett, P.L.L.C.

(57) ABSTRACT

In a Circuit Switched Services over Long Term Evolution via Generic Access Network, CSoLTEvGAN architecture (600), relations between E-UTRAN cells (9201) and Generic Access Network, GAN cells (9101) are configured manually in a generic access node controller, GANC (910). This may become a tremendous burden for the operator. The current invention overcomes this by automatically build the needed relations. This is accomplished by determining at the GANC (910), cell identification information for an E-UTRAN cell (9201) and cell identification information for a GERAN or UTRAN cell (1101) overlaying the E-UTRAN cell (9201). The GAN cell (9101) is determined based on the cell identification information for the GERAN or UTRAN cell (1101). An entry within a translation table (1000) is created so that the cell identification information for the E-UTRAN cell (9201) is mapped to the cell identification information for the GAN cell (9101), or vice versa.

5 Claims, 13 Drawing Sheets

CSoLTEvGAN ARCHITECTURE

OTHER PUBLICATIONS

3rd Generation Partnership Project. 3GPP TR 23.879, V1.1.1 (Dec. 2008). 3rd Generation Partnership Project; Technical Specification Group Services and System Aspects; Study on Circuit Switched (CS) domain services over evolved Packet Switched (PS) access; Stage 2 (Release 9). Dec. 2008.

3rd Generation Partnership Project. 3GPP TS 43.318, V8.3.0 (Aug. 2008). 3rd Generation Partnership Project; Technical Specification Group GSM/Edge Radio Access Network; Generic Access Network (GAN); Stage 2 (Release 8). Aug. 2008.

* cited by examiner

CSoLTE REFERENCE ARCHITECTURE
(PRIOR ART)

CSoLTE CONTROL PLANE PROTOCOL ARCHITECTURE (PRIOR ART)

CSoLTE USER PLANE PROTOCOL ARCHITECTURE
(PRIOR ART)

CS DOMAIN CONTROL PLANE ARCHITECTURE
RELATED TO THE Up-INTERFACE
(PRIOR ART)

| E-CGI | TAI | GAN-CGI |
|---|---|---|
| 0x0DE1 | 012-011-123 | 012-011-056-23 |
| 0x0ED3 | | 012-011-054-25 |
| | 012-011-534 | 012-011-055-78 |
| etc. | | |

CONFIGURING RELATIONS BETWEEN CELLS IN DIFFERENT RADIO ACCESS NETWORKS

TECHNICAL FIELD

The present invention relates to a method an arrangement for configuring relations between cells in different radio access networks.

BACKGROUND

Mobile CS (Circuit Switched) services based on GSM (2G) and WCDMA (3G) radio access are a world-wide success story and allow obtaining telecommunication services with a single subscription in almost all countries of the world. Also today, the number of CS subscribers is still growing rapidly, boosted by the rollout of mobile CS services in dense population countries such as India and China. This success story is furthermore extended by the evolution of the classical MSC architecture into a softswitch solution which allows using packet transport infrastructure for mobile CS services.

In 2006 the 3GPP group started with a work item called "Evolved UTRA and UTRAN" which became commonly known under the acronym E-UTRAN, Evolved Universal Terrestrial Radio Access Network. The purpose of the work item was to define a Long-Term Evolution (LTE) concept that assures competitiveness of 3GPP-based access technology.

LTE/E-UTRAN will use OFDM radio technology in the downlink and SC-FDMA for the uplink, allowing at least 100 Mbps peak data rate for downlink data rate and 50 Mbps for uplink data rate. LTE radio can operate in different frequency bands and is therefore very flexible for deployment in different regions of the world.

In parallel to Radio Access Network (RAN) standardization for the LTE, 3GPP also drives a System Architecture Evolution (SAE) work item to develop an evolved packet core network. The SAE core network is made up of core nodes such as Control Plane nodes as the MME, Mobility Management Entity and User Plane nodes as the Serving Gateway (S-GW) and the Packet Data Network Gateway (PDN GW or P-GW). A co-location of the S-GW and the P-GW is also denoted Access Gateway (AGW).

Common to LTE/SAE is that only a Packet Switched (PS) domain will be specified, i.e. all services are to be supported via this domain. GSM and WCDMA however provide both PS and CS access simultaneously. So if telephony services shall be deployed over LTE radio access, an IMS based service engine is mandatory.

It has been investigated how to use LTE/SAE as access technology to the existing CS core domain infrastructure. The investigated solutions are called "CS over LTE" solutions. Three different solutions have been identified so far.

The first solution is called "CS Fallback" and means that a mobile terminal is performing SAE MM (mobility Management) procedures towards the MME while camping on LTE access. The MME registers the terminal in a MSC-S for CS based services. When a page for CS services is received in the MSC-S it is forwarded to the terminal via the MME and then the terminal performs fallback to the 2G or 3G RANs. Similar behavior applies for Mobile originated CS services and when these are triggered and the terminal is camping on LTE access, it will fallback to 2G or 3G RANs and trigger the initiation of the CS service there. This solution has been specified in the technical standard 3GPP TS 23.272.

The second solution is called CS over LTE Integrated (CSoLTE-I). In this solution the same SAE MM procedures as for "CS Fallback" are used, but instead of performing fallback to the 2G or 3G RANs, the terminal will perform all the CS services over the LTE access. This means that the CS services (also called Connection Management, CM procedures) are transported over IP-based protocols between a Packet MSC PMSC and the terminal using the LTE access and the SAE nodes like the AGW.

The third solution is called CS over LTE Decoupled (CSoLTE-D). In this case both MM and CM procedures are transported over IP-based protocols directly between the PMSC and the terminal using the LTE access and the SAE user plane nodes like the AGW.

3GPP has also standardized the Generic Access Network (GAN) concept starting from 3GPP Release-6. The more correct name is "Generic Access to A/Gb Interfaces" and this standardization was based on the Unlicensed Mobile Access (UMA) de-facto specifications.

GAN provides a new radio access network and the node corresponding to the GERAN (GSM EDGE Radio Access Network) the Base Station Controller, BSC is called Generic Access Network Controller (GANC). GAN is specified in the 3GPP TS 43.318 and TS 44.318. The basic principle is that the mobile terminal (in the specifications called MS, Mobile Station) is a dual-mode radio handset including for example both WiFi and 3GPP-macro radio support (GSM, WCDMA or both). The mobile terminal connects to a WiFi Access point (AP) using the WiFi Radio. The GAN standard defines for example how the mobile terminal can function in GAN mode and access the services provided by the GSM CN (Core Network) using the Up-interface between the mobile terminal and the GANC.

The main principle in GAN is that the mobile terminal is configured with Provisioning GANC address information and this is the initial point of contact in the network and the mobile terminal triggers the GAN Discovery procedure towards the Provisioning GANC that is placed in the Home Public Land Mobile Network HPLMN. The only purpose of the GAN Discovery procedure is to provide the mobile terminal with information about a Default GANC that also resides in the HPLMN. The Default GANC is the node where the mobile terminal always connects to initially when it attempts to use GAN in a new location. The Default GANC may redirect the mobile terminal to a Serving GANC that may be placed either in the HPLMN or in a VPLMN (Visited PLMN). The mobile terminal may also store information about Serving GANCs in a Serving GANC table.

The main principle in the CS Domain Control Plane Architecture related to GAN and the Up-interface is that the GANC uses the normal A-interface signaling towards the MSC. The GANC interworks the related protocol, like BSSAP, towards the relevant GAN-protocols, like GA-CSR (Generic Access, Circuit Switched Resources), in both directions.

The solution of using the GAN concept for CS over LTE (CSoLTEvGAN) is disclosed in the 3GPP technical report TR 23.879 as one of the alternatives for CS service support over LTE. The technical report covers a number of different alternatives. The basic idea for the CSoLTEvGAN alternative is to see LTE as a Generic Access Network and to use the GAN protocols for control and user plane.

An important difference in the CSoLTEvGAN solution compared to the GAN solution is the registration procedure. It has been proposed that the mobile terminal triggers the GAN registration procedure when the mobile terminal enters LTE coverage and triggers the GAN registration update procedure each time the mobile terminal changes tracking area (TA) in LTE/E-UTRAN. At each GAN registration and registration update procedure the mobile terminal will include cell identification information about the LTE/E-UTRAN cell the mobile terminal is connected to. The GANC will, based on the E-UTRAN cell identification information, select a GAN cell having its own cell identification information. This GAN cell identification information is sent to an MSC in the core network in order to indicate the current location of the mobile terminal. The relations between the E-UTRAN cell identification information and the cell identification information for the GAN cell is configured in the GANC. The solutions proposed so far rely on the GANC being manually configured.

A disadvantage is that a manual configuration of the needed relations may become a tremendous burden for the operator. Initially, there needs to be one GAN cell defined for each E-UTRAN cell and for each MSC where the mobile terminal may connect to via a GANC. After this, whenever there are changes to the cell structure in the E-UTRAN, the effect of the related changes needs to be verified also in the GAN to see whether any changes are needed to the defined relations between E-UTRAN and GAN cells.

SUMMARY

It is the object of the present invention to avoid the problems mentioned above. The invention comprises a method to automatically build the needed relations between the E-UTRAN cell identification information and the GAN cell identification information.

This is accomplished by receiving at the GANC, cell identification information for an E-UTRAN cell from a mobile terminal in a signaling message being either a response to an explicit but optional request or an unsolicited signaling message.

Cell identification information for a GERAN or UTRAN cell overlaying the E-UTRAN cell is further determined. This can for example be done by receiving the information in a signaling message from the mobile terminal or by interrogating an O&M unit. After receiving the cell identification information for the E-UTRAN cell and the GERAN or UTRAN cell, the cell identification information for a GAN cell is determined. This is based on the received cell identification information for the GERAN or UTRAN cell overlaying the E-UTRAN cell.

After the cell identification information for the GAN cell has been determined, an entry within a translation table is created so that the cell identification information for the E-UTRAN cell is mapped to the cell identification information for the GAN cell, or vice versa.

Alternatively, cell identification information for an E-UTRAN cell is received from the mobile terminal but the GAN cell identification information is determined by translating at least one portion of the E-UTRAN cell identification information to at least one portion of the GAN cell identification information.

By automatically configuring the relations between the E-UTRAN cell and the GAN cell, the operator is revealed from costly and time consuming manual configurations. Another advantage is that the configuration automatically adapts to changes in the E-UTRAN cell structure.

The invention also includes a GANC adapted to perform the method described above.

BRIEF DESCRIPTION OF THE DRAWINGS

FIG. 10 is a block diagram illustrating an example of a GANC configuration table.

DETAILED DESCRIPTION

In order to illustrate the prior art related to the invention, the description refers to a number figures where some of them also can be found in different specifications on different network architectures. Different terms like MS (Mobile Station) and UE (User Equipment) are used in the figures but these are equally referred to in the description and the claims as Mobile Terminals.

Figure 1:
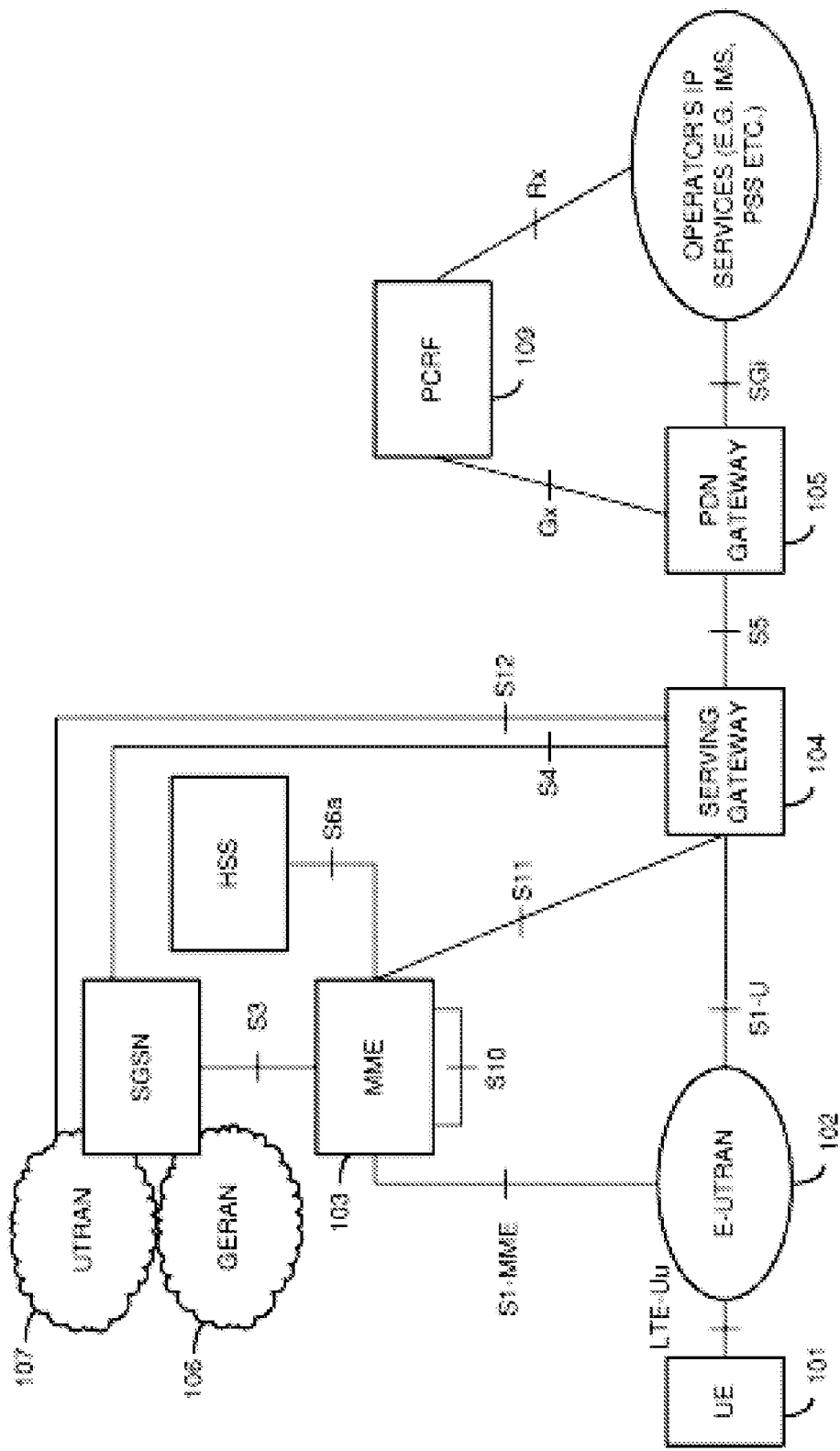
FIG. 1 is a block diagram illustrating the LTE/SAE architecture.
Figure 4:
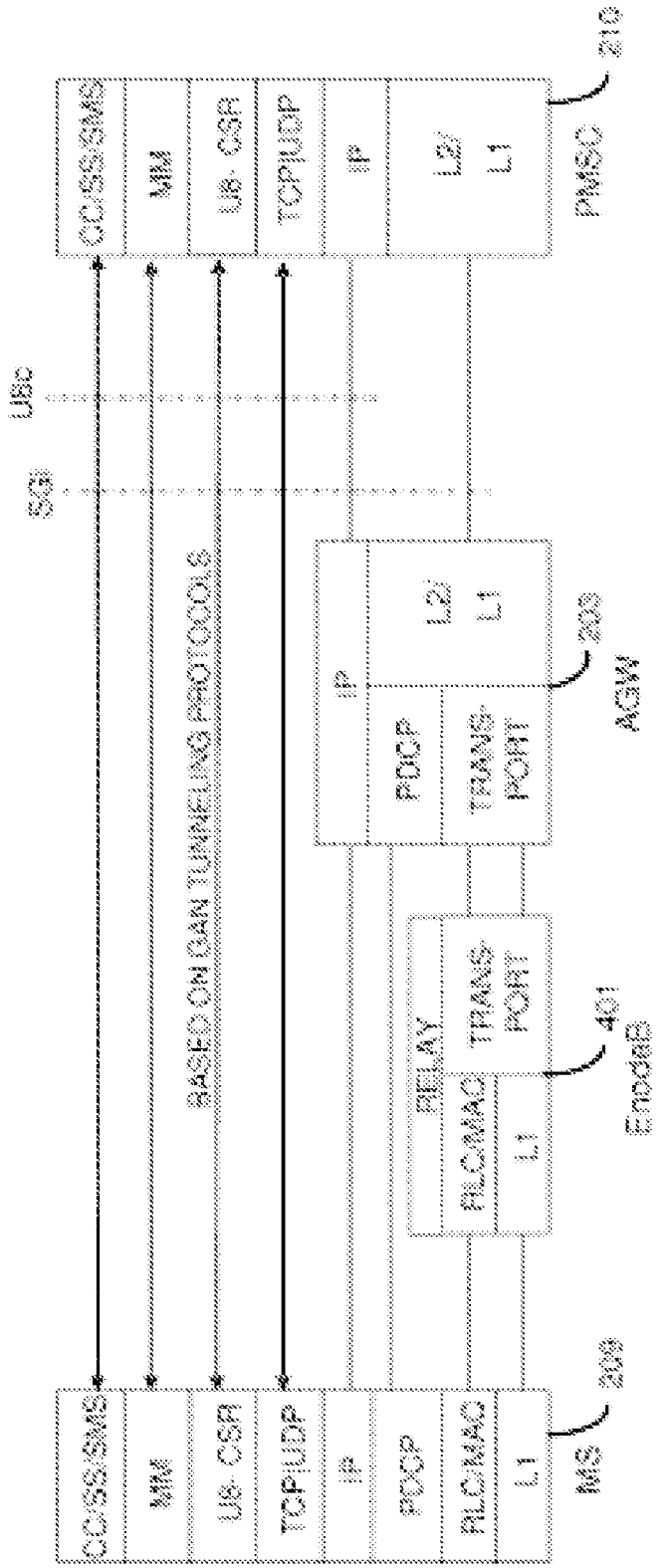
FIG. 4 is a block diagram illustrating the CSoLTE control plane architecture.

FIG. 1 illustrates the LTE/SAE architecture as described in the 3GPP technical specification TS 23.401 (figure 4.2.1-1). The architecture comprises a number of network elements and interfaces in between. The radio interface for example corresponds to the LTE-Uu interface between the mobile terminal UE 101 and the radio access network E-UTRAN 102. The radio access network E-UTRAN 102 further comprises at least one base station (not shown in FIG. 1) called eNodeB.

The SAE core network is made up of core nodes such as Control Plane nodes as the MME, Mobility Management Entity 103 and User Plane nodes as the Serving Gateway (S-GW) 104 and the Packet Data Network Gateway (PDN GW or P-GW) 105. A co-location of the S-GW 104 and the P-GW 105 is also denoted Access Gateway (AGW).

Common to the LTE/SAE architecture is that only a Packet Switched (PS) domain will be specified, i.e. all services are to be supported via this domain. GSM/GERAN 106 and WCDMA/UTRAN 107 however provide both PS and CS access simultaneously. So if telephony services shall be deployed over the LTE radio access LTE-Uu and the E-UTRAN 102, an IMS based service engine is mandatory.

Figure 2:
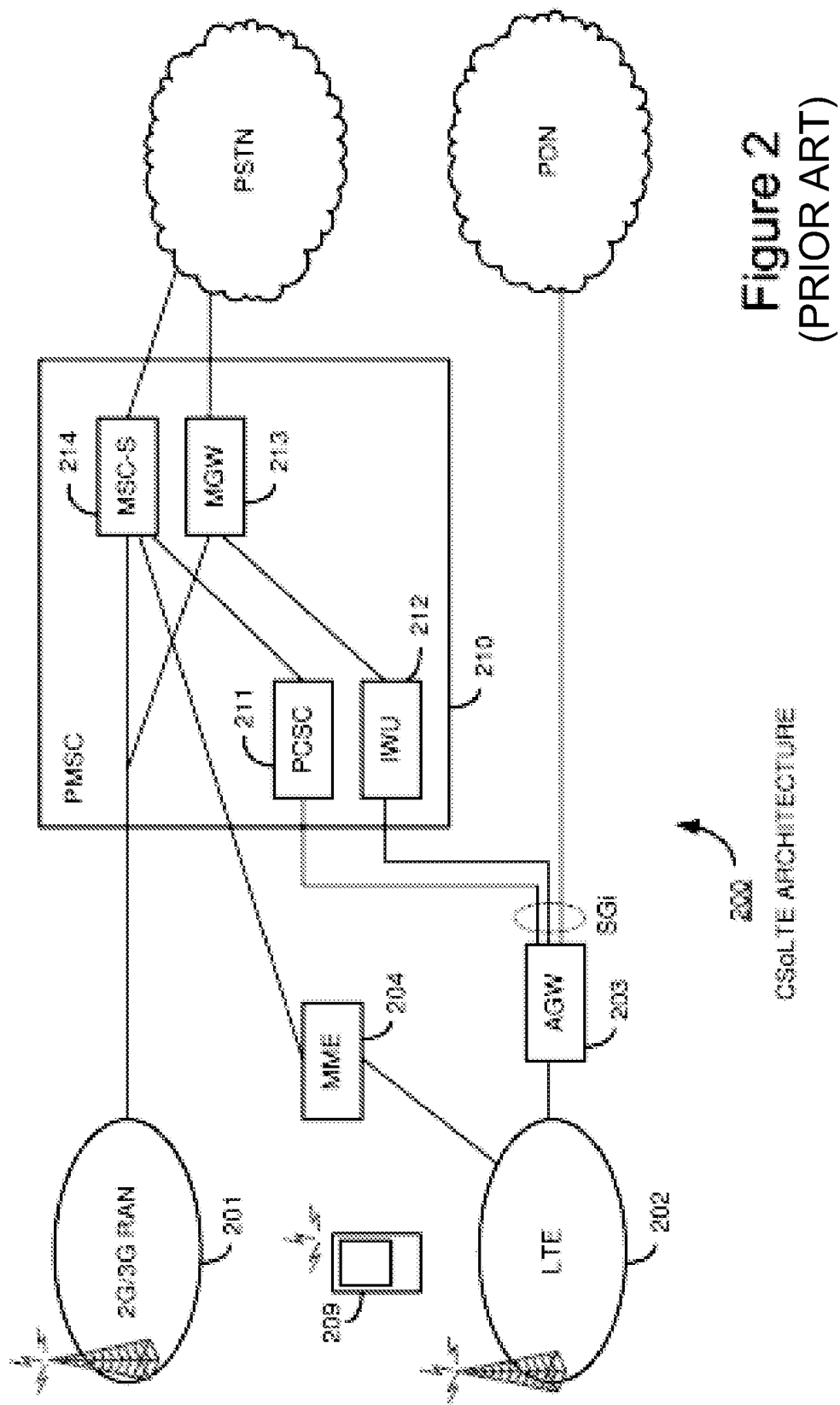
FIG. 2 is a block diagram illustrating the CSoLTE architecture.

It has been investigated how to use LTE/SAE as access technology to the existing CS core domain infrastructure. The investigated solutions are called "CS over LTE" solutions and the basic architecture 200 for these solutions is illustrated by FIG. 2.

A Packet MSC (PMSC) 210 can be serving both traditional 2G and 3G radio access networks, RANs 201 and the new CS (domain) over LTE based solutions 202. The PMSC 210 contains two new logical functions called a Packet CS Controller (PCSC) 211 and an Interworking Unit (IWU) 212.

Between the LTE 202 and the PMSC 210 an access gateway AGW 203 is located. This AGW 203 can in some implementations be separated into two gateways an S-GW and a P-GW as described above. The PMSC 210 further comprises a Media Gateway MGW 213. FIG. 2 also includes a mobile terminal 209, a Mobility Management Entity, MME 204 and an MSC server 214.

Figure 3:
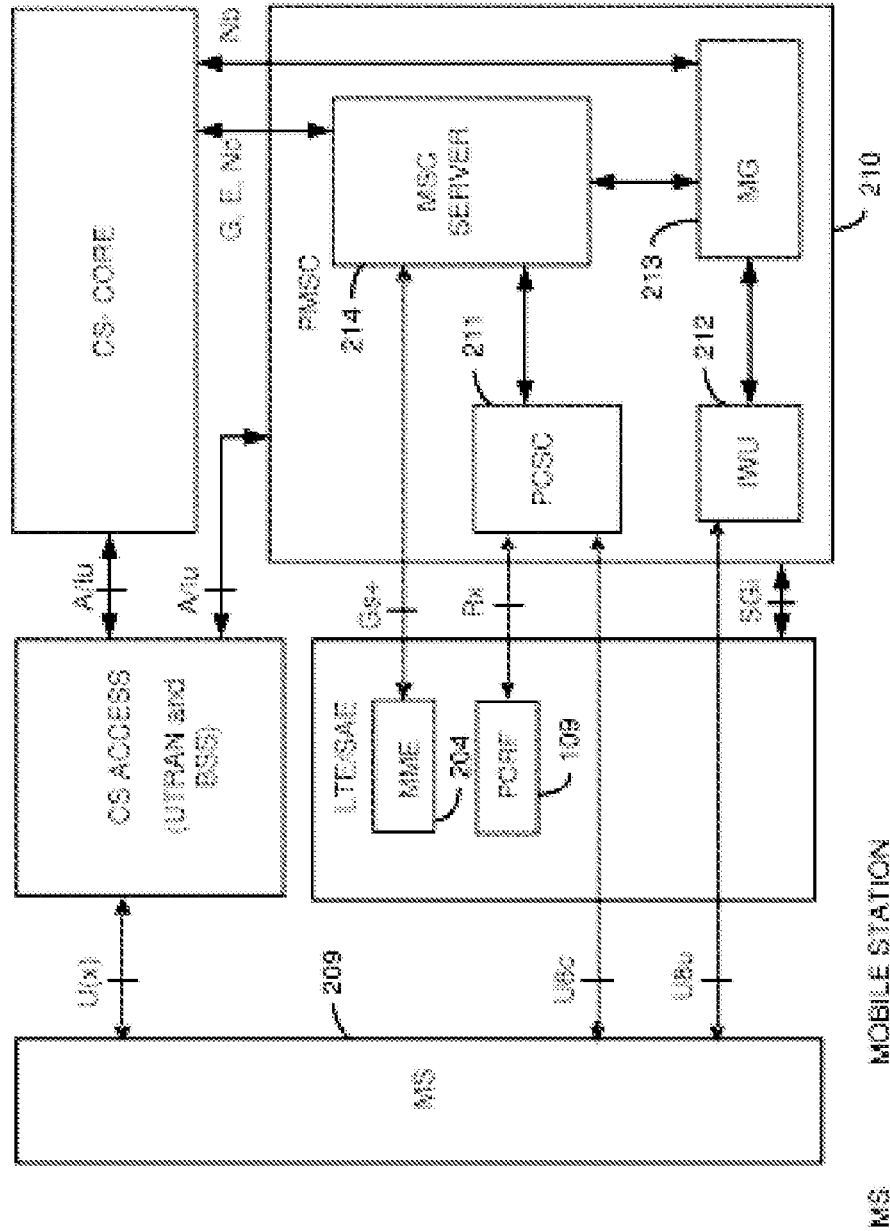
FIG. 3 is a block diagram illustrating the CSoLTE reference architecture.

The functions and the interfaces of the PMSC 210 are further illustrated in FIG. 3. The communication between the mobile terminal 209 (in FIG. 3 called MS, Mobile Station) and the PMSC 210 is based on the SGi interface. This means that all direct communication between the mobile terminal 209 and the PCSC 210 and the IWU 212 in the PMSC 210 is based on IP protocols and that the mobile terminal 209 is visible and reachable using an IP-address via the AGW 203. This communication is divided into two different interfaces, U8c for the control plane and U8u for the user plane. The PCSC 210 has also an Rx interface to the PCRF 109 for allocation of LTE/SAE bearers.

Figure 5:
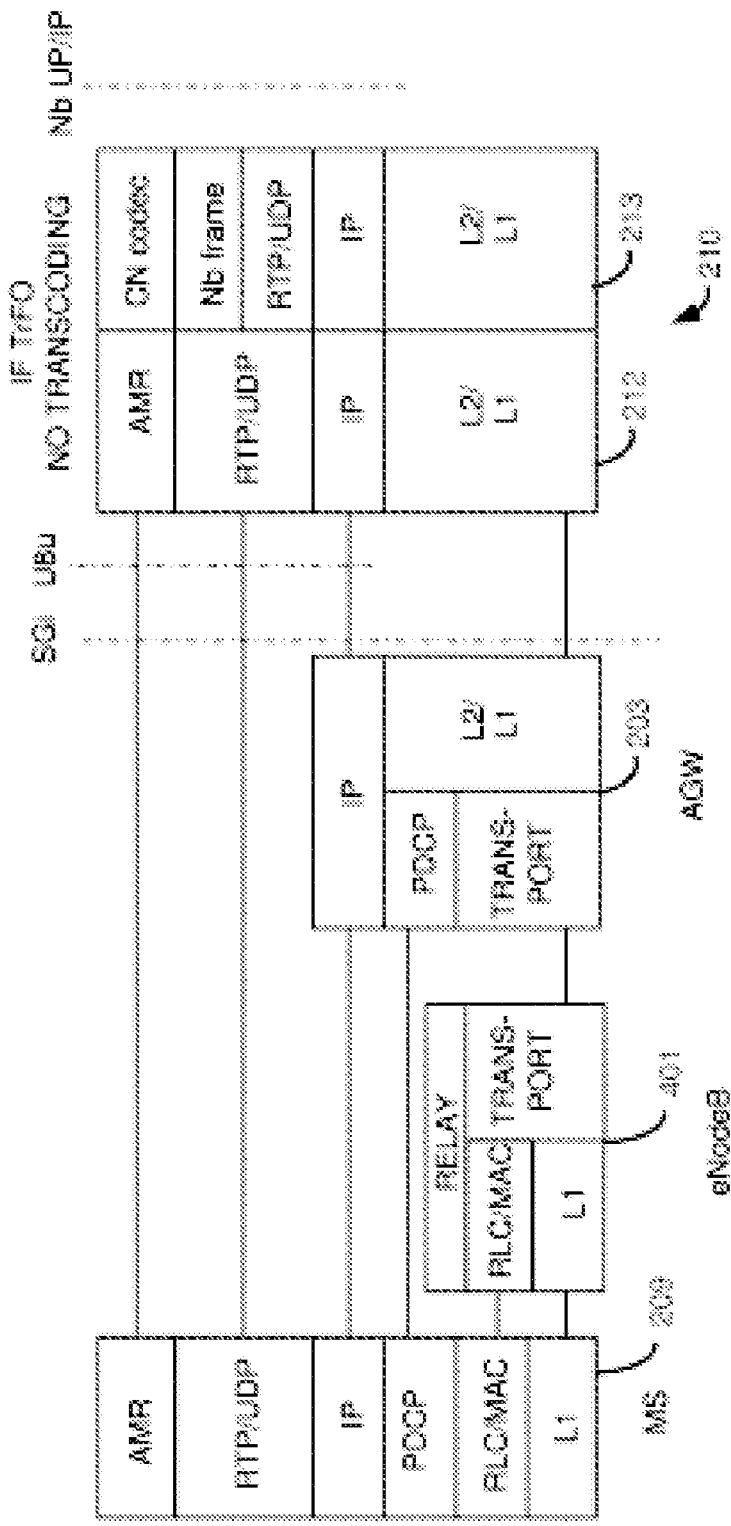
FIG. 5 is a block diagram illustrating the CSoLTE user plane architecture.

The control plane protocol architecture between the mobile terminal 209 terminal and the PMSC 210 (i.e. the U8c interface) is shown in FIG. 4. The user plane protocols between the mobile terminal 209 and the PMSC 210 (i.e. the U8u interface) are shown in FIG. 5. The intermediate network elements involved are an eNodeB 401 (located in LTE access network 202) and the access gateway AGW 203.

Returning to FIG. 3, three different solutions for providing CS over LTE have been identified so far. The first solution is called "CS Fallback" and means that a mobile terminal 209 is performing SAE MM (mobility Management) procedures towards the MME 204 while camping on the LTE access 202. The MME 204 registers the terminal in the MSC-S 214 for CS based services. When a page for CS services is received in the MSC-S 214 it is forwarded to the terminal via the MME 204 and then the mobile terminal 209 performs fallback to the 2G or 3G RANs 201. Similar behavior applies for Mobile originated CS services and when these are triggered and the mobile terminal 209 is camping on LTE access 202, it will fallback to 2G or 3G RANs 201 and trigger the initiation of the CS service there. This solution has been specified in the standard 3GPP TS 23.272.

The second solution is called CS over LTE Integrated (CSoLTE-I). In this solution the same SAE MM procedures as for "CS Fallback" are used, but instead of performing fallback to the 2G or 3G RANs 201, the mobile terminal 209 will perform all the CS services over the LTE access 202. This means that the CS services (also called Connection Management, CM procedures) are transported over IP-based protocols between the PMSC 210 and the mobile terminal 209 using the LTE access 202 and the SAE nodes like the AGW 203.

The third solution is called CS over LTE Decoupled (CSoLTE-D). In this case both MM and CM procedures are transported over IP-based protocols directly between the PMSC 210 and the mobile terminal 209 using the LTE access 202 and the SAE user plane nodes like the AGW 203.

3GPP has also standardized the Generic Access Network (GAN)-concept starting from 3GPP Release-6. The more correct name is "Generic Access to A/Gb Interfaces" and this standardization was based on the Unlicensed Mobile Access (UMA) de-facto specifications.

Figure 6:
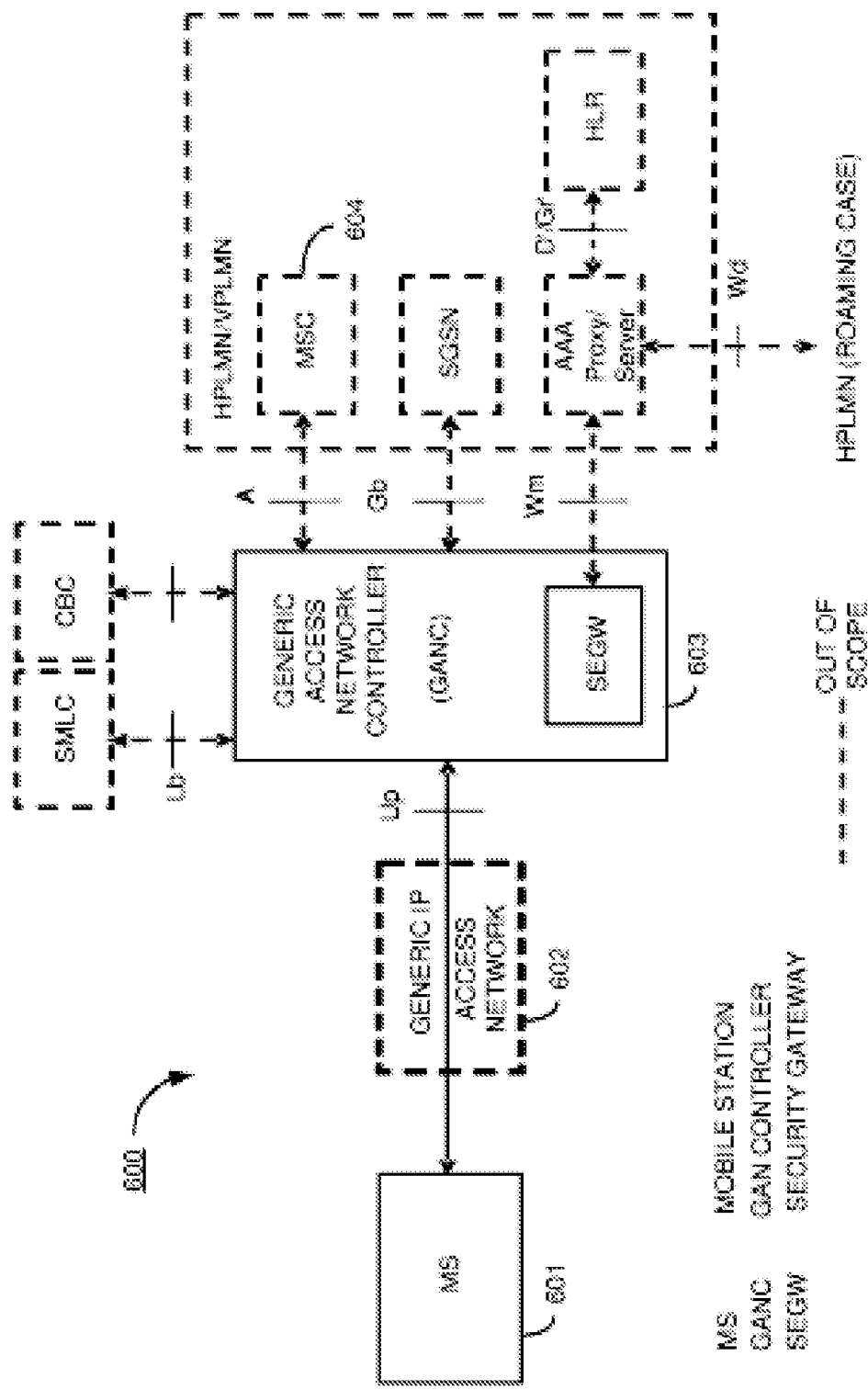
FIG. 6 is a block diagram illustrating the functional architecture of GAN.

GAN provides a new radio access network and the node corresponding to the GERAN (GSM EDGE Radio Access Network) BSC is called Generic Access Network Controller (GANC). GAN is specified in the 3GPP technical specifications TS 43.318 and TS 44.318. FIG. 6 shows the functional architecture of GAN 600 as described in TS 43.318. The basic principle is that the mobile terminal MS 601 is a dual-mode radio handset including for example both WiFi and 3GPP-macro radio support (GSM, WCDMA or both). The mobile terminal MS 601 connects to a WiFi Access point (AP) (not shown in FIG. 6) using the WiFi Radio. Between the WiFi Access point (AP) and the GANC 603 is a generic (packet based) IP access network 602 located. The GAN standard defines for example how the mobile terminal MS 601 can function in GAN mode and access the services provided by the GSM CN (Core Network) using the Up-interface between the mobile terminal MS 601 and the GANC 603.

The initial GAN standard can be called "2G-GAN" or "GSM-GAN" as the standard GSM interfaces, A and Gb are used between the GANC 603 and the CN. In addition, work is ongoing to standardize a "3G-GAN" or "WCDMA-GAN" solution. In this case, the GANC 603 will use the standard WCDMA interfaces, for example the Iu-cs and the Iu-ps interfaces to connect to the CN. The resulting standard can be also called "Generic Access to Iu Interface" or shortly "GAN-Iu".

The main principle in GAN 600 is that the mobile terminal MS 601 is configured with Provisioning GANC address information and this is the initial point of contact in the network and the mobile terminal MS 601 triggers the GAN Discovery procedure towards the Provisioning GANC that is placed in the Home PLMN (HPLMN). The only purpose of the GAN Discovery procedure is to provide the mobile terminal MS 601 with information about a Default GANC that also resides in the HPLMN. The Default GANC is the node where the mobile terminal MS 601 always connects to initially when it attempts to use GAN 600 in a new location. The Default GANC may redirect the mobile terminal MS 601 to a Serving GANC that may be placed either in the HPLMN or in a VPLMN (Visited PLMN). The mobile terminal MS 601 may also store information about Serving GANCs in a Serving GANC table.

Figure 7:
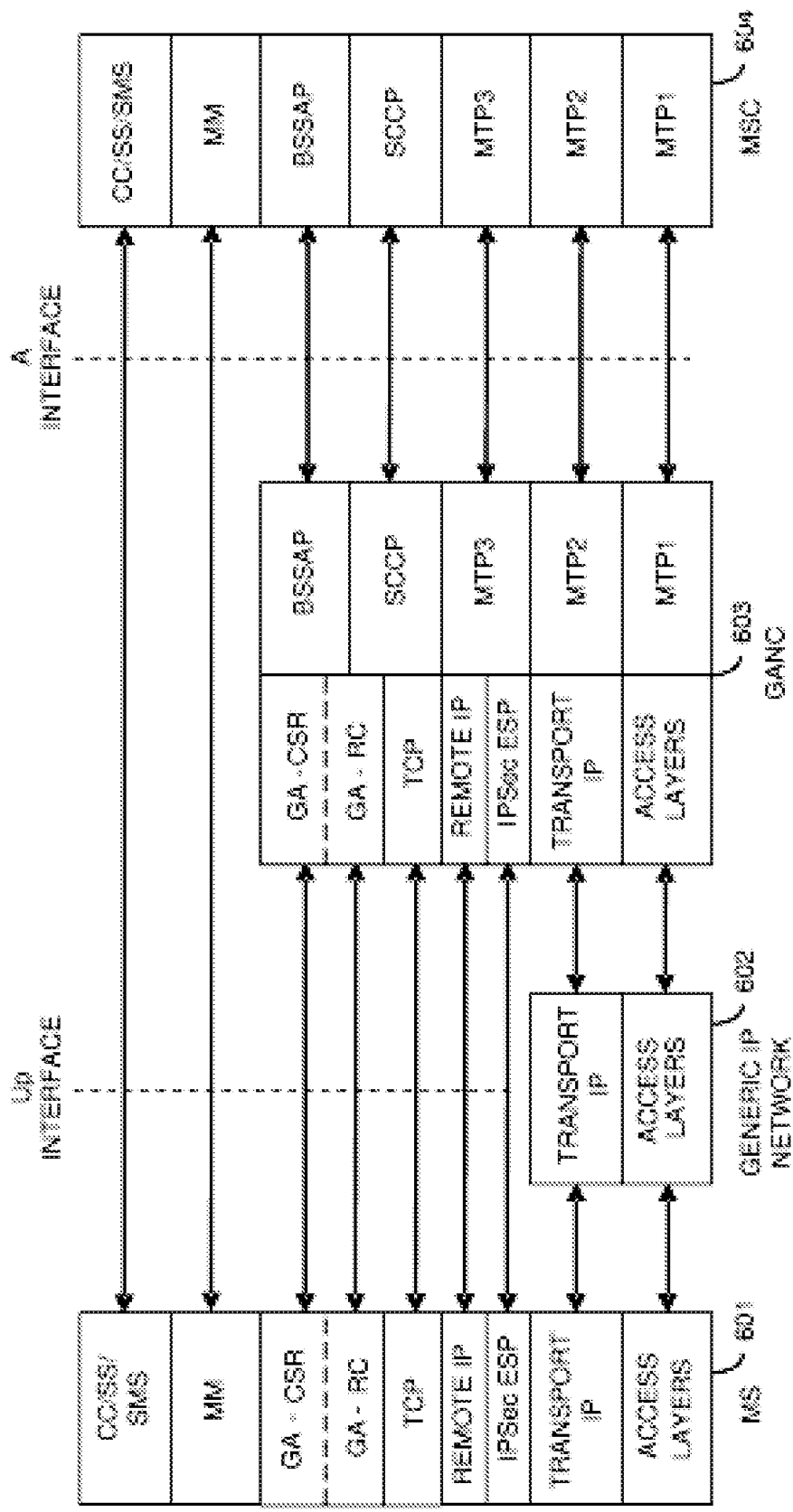
FIG. 7 is a block diagram illustrating the CS domain control plane architecture related to the Up interface.

FIG. 7 shows the CS Domain Control Plane Architecture related to GAN and the Up-interface. The main principle is that the GANC 603 uses the normal A-interface signaling towards the MSC 604 and interworks the related protocol, like BSSAP, towards the relevant GAN-protocols, like GA-CSR (Generic Access, Circuit Switched Resources), in both directions.

Figure 8:
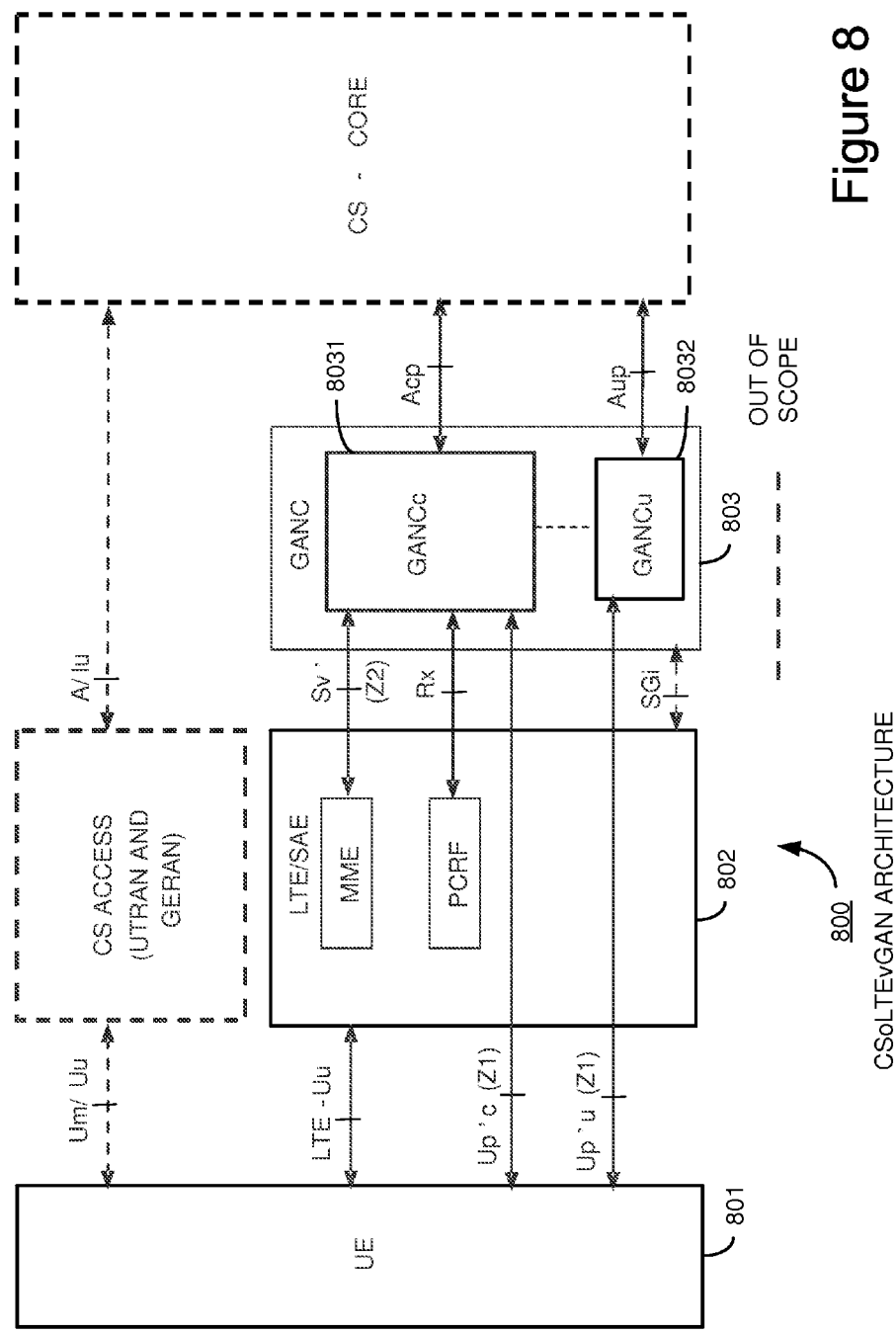
FIG. 8 is a block diagram illustrating the CSoLTEvGAN architecture.

The solution of using the GAN concept for CS over LTE (CSoLTEvGAN) is illustrated in FIG. 8. The basic idea for the CSoLTEvGAN alternative is to see LTE/SAE 802 as a Generic Access Network and to use the GAN protocols for control GANCc 8031 and user plane GANCu 8032 between the mobile terminal UE 801 and the GANC 803.

The CS services are basically VPLMN services in the case of roaming, thus execution of calls are mainly done in a MSC within the VPLMN. Therefore the CSoLTEvGAN should also be a VPLMN service, thus the CS service should be handled by a MSC within the VPLMN. This means that also the serving GANC must be present in the VPLMN, and that it must be possible to use local breakout for the Access Point Name (APN) used for CSoLTEvGAN.

One major difference for the GANC in the CSoLTEvGAN solution compared to the GAN solution is that handover is triggered using the SRVCC procedures over the Sv' interface between the GANC 803 and the MME in the LTE/SAE 802. The SRVCC (Single Radio Voice Call Continuity) procedure is a procedure in 3GPP to switch an IMS-anchored voice call in LTE to the CS domain (MSCs) in GSM or WCDMA. Only the handover triggering part is used from the SRVCC solution as there is no need for any domain transfer procedure between the MSC and IMS CN (Core Network).

Another important difference in the CSoLTEvGAN solution compared to the GAN solution is the TA concept and the impact this has on the GAN registration procedure. TA stands for Tracking Area and is an area concept within LTE similar to Location Area and Routing Area within GSM. It has been proposed that the mobile terminal triggers the GAN registration procedure when the mobile terminal enters LTE coverage and the GAN registration update procedure each time the mobile terminal changes TA in LTE. At each GAN registration and registration update procedure the mobile terminal will include information about the E-UTRAN cell (identified by both TAI, Tracking Area Identity, and ECGI, E-UTRAN Cell Global Identity) the mobile terminal is connected to. The GANC will, based on the E-UTRAN cell information, select a GAN cell and a Cell Global Identity CGI (GAN-CGI) on GSM format. In a similar way, the GANC could select an UTRAN Service Area Identity SAI (i.e. a so called GAN-SAI) in WCDMA format if the GANC is connected to the core network using an Iu-interface. In this description, the GSM format i.e. a GAN-CGI is mostly used as example and only the important differences between handling of GAN-CGIs and GAN-SAIs are described. One principle for the mapping from E-UTRAN cells and TA to GAN-CGI and LA is depicted in FIG. 9.

Figure 9:
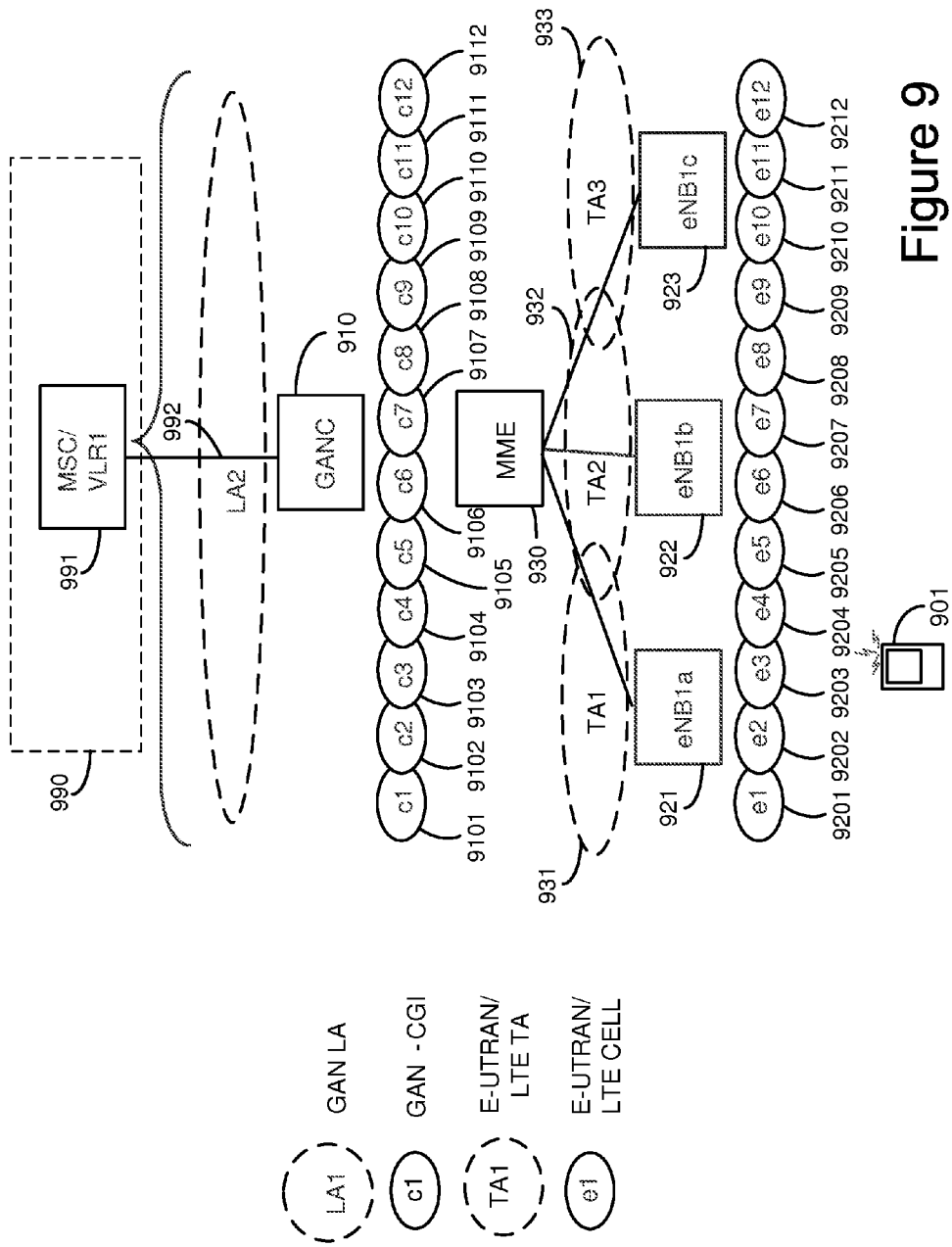
FIG. 9 is a block diagram illustrating GAN cells and LTE/E-UTRAN cells.

The lower part of FIG. 9 shows a real LTE/SAE network with a mobile terminal 901 and multiple E-UTRAN cells denoted e1-e12 9201-9212. In addition, three eNodeBs 921-923 and tracking areas TAs 931-933 are shown, but these are not really important for this example. The upper part of FIG. 9 shows an overlay GAN cell network with a GANC 910. The intention is that for each E-UTRAN cell e1-e12 9201-9212 there is defined a GAN cell (each having a GAN-CGI), c1-c12 9101-9112. These GAN cells c1-c12 9101-9112 and their GAN-CGIs are really fictive and are only used by the GANC 910 to inform the MSC 991 in the core network 990 about the location of the mobile terminal 901. The GANC 910 uses the mechanisms and identifiers that are possible over the interface 992 between the GANC 910 and the MSC 991 e.g. the A-interface for GSM/GERAN. So for example when the mobile terminal 901 is located in and served by the E-UTRAN cell e3 9203, then the GAN cell C3 9103 and the associated GAN-CGI can be used to indicate the current location to the MSC 991. FIG. 9 shows the case when there is configured one GAN cell 9101-9112 for each E-UTRAN cell 9201-9212. However, other mappings are also possible, for example one GAN cell 9103 for a TA 931 or a group of E-UTRAN cells.

The solutions proposed so far rely on the GANC 910 being manually configured with the relations between the E-UTRAN CGIs/TAIs and the needed GAN cells and related cell identification information to be indicated towards the MSC 991. The following relations need to be manually updated:
a) For GAN A/Gb mode: E-UTRAN CGI & TAI→GAN-CGI (i.e. GSM format where LAI is part of the CGI)
b) For GAN Iu mode: E-UTRAN CGI & TAI→GAN-SAI (i.e. WCDMA format where LAI is part of the SAI)

The table 1000 in FIG. 10 shows an example of how the case a) above (i.e. GAN A/Gb mode) could be configured in the GANC 910. Three different variants are shown depending on if both ECGI and TAI or only one of these is used to select the GAN-CGI.

In the GAN A/Gb mode case and when e.g. a call is set up towards the MSC 991, the CGI sent to the MSC 991 in 48.008 COMPLETE LAYER 3 message is the GAN-CGI selected during for example the GAN registration depending on the GANC 910 configuration. The GAN-CGI selection could for example take place during GAN registration or registration update procedures or during GAN signaling connection establishment. The CGI may be used for Location Based Services in the MSC 991 or for routing of emergency calls to the proper emergency center or for other Location Based services, for example to find out where is the closest "Pizza-Hut".

As mentioned above, the manual configuration of the needed relations between E-UTRAN CGIs & TAIs and either the GAN-CGIs or the GAN-SAIs may become a tremendous burden for the operator. Initially, there needs to be one GAN cell 9101-9112 with GAN-CGI defined for each E-UTRAN cell 9201-9212 and for each MSC 991 where the mobile terminal 901 may connect to via a GANC 910. After this whenever there are changes to the cell structure in the E-UTRAN, the effect of the related changes needs to be verified also in the GAN to see whether any changes are needed to the defined relations between E-UTRAN and GAN cells.

The described invention comprises a method where the GANC 910 automatically builds the needed relations between the E-UTRAN cells and the GAN-CGIs (and GAN-SAIs) to be reported to the circuit switched core network 990 (i.e. the MSC 991). The invention comprises different embodiments on how the GANC 910 can build these relations and these embodiments are based on the following principles:

1. The mobile terminal 901 is reporting the relations between the E-UTRAN cells and GERAN/UTRAN cells to the GANC 910 and the GANC 910 is using this information to select the correct GAN-CGIs and GAN-SAIs to be used towards the MSC 991.
2. Automatic provisioning of the IRAT (Inter Radio Access Technology) Automatic Neighbour Relation (ANR) information that is dynamically learnt in the eNodeBs 921-923 to the GANC 910, either via an O&M system 1330 (shown in FIG. 13) or via a new or existing interface between the GANC 910 and the MME 930. The GANC 910 can use this information to select the correct GAN-CGIs and GAN-SAIs to be used towards the MSC 991.
3. The GANC 910 is learning the relations between E-UTRAN and GERAN/UTRAN cells based on handover signaling between the E-UTRAN and GERAN/UTRAN networks. The GANC 910 can use this information to select the correct GAN-CGIs and GAN-SAIs to be used towards the MSC 991.
4. An algorithm executed in the GANC 910 mapping/translating E-UTRAN cell identification information to GAN-CGIs/GAN-SAIs.

Figure 11:
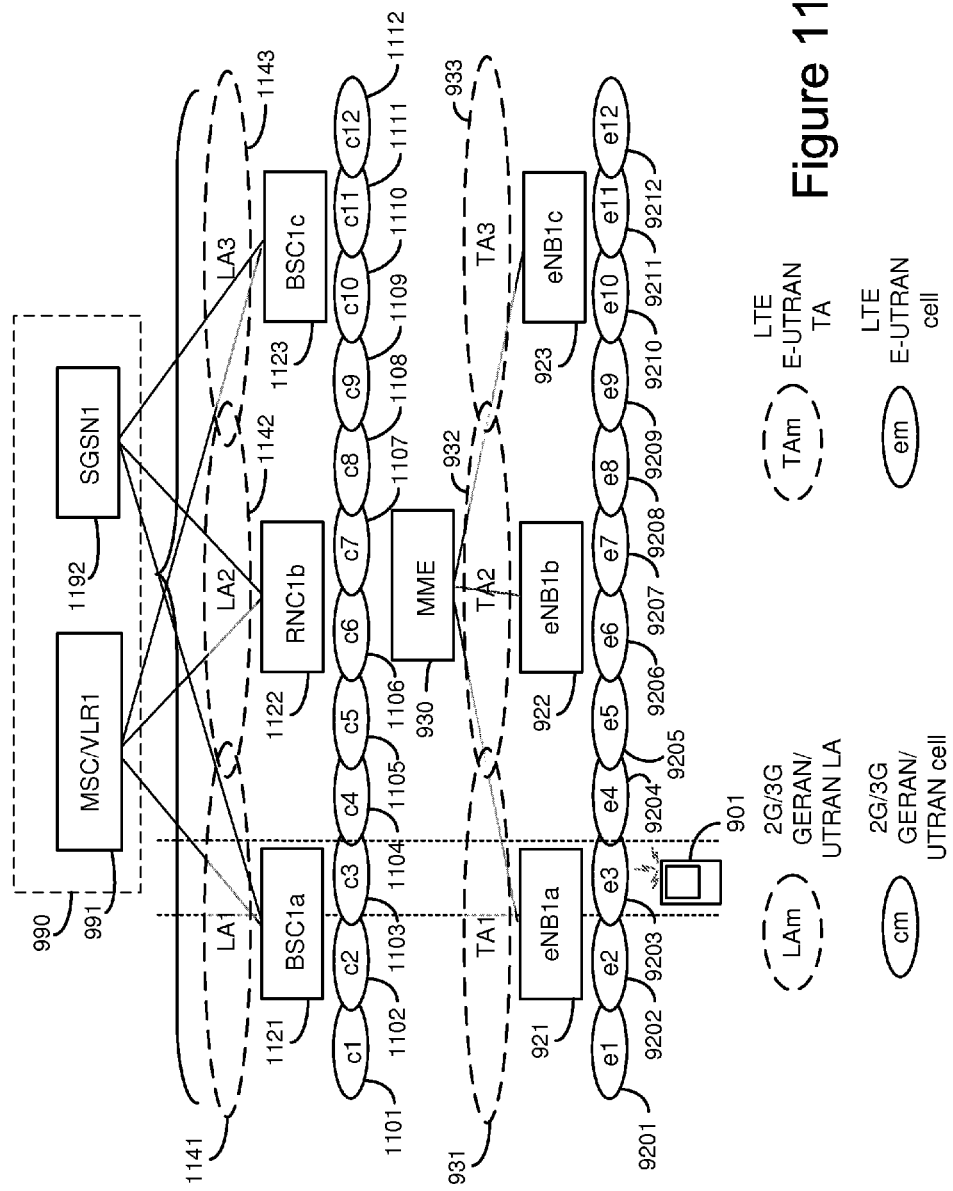
FIG. 11 is a block diagram illustrating an example of overlaying E-UTRAN and GERAN/UTRAN cells.

A number of embodiments are based on the principle that there exists both an E-UTRAN network and a GERAN/UTRAN network (either or both). The lower part of FIG. 11 shows an E-UTRAN network with one MME 930 and three eNodeBs eNB1a-c 921-923. In this simplified example, each eNB1a-c 921-923 holds its own tracking area TA1-3 931-933 and four different cells 9201-9204 etc. The upper part of FIG. 11 shows that there also exists both a GERAN and an UTRAN network in addition to the E-UTRAN network. Even this part is simplified and shows two Base Station Controllers, BSC1a, BSC1c 1121,1123 and one Radio Network Controller RNC1b 1122 connected to the MSC 991 and a Serving GPRS Support Node SGSN1 1192 in the core network 990. Also in this case each BSC1a, BSC1c 1121,1123 and RNC1b 1122 respectively holds one location area LA1-3 1141-1143 and four different cells 1101-1104 etc. In a more likely scenario, there would even be three levels of networks i.e. the middle part would not only be covered by the RNC and UTRAN network but also with one or more BSCs. FIG. 11 also shows that the E-UTRAN and GERAN/UTRAN cells would be geographically covering the same locations, e.g. the location of the mobile terminal 901 is covered by an E-UTRAN cell e3 9203 and by a GERAN cell c3 1103. In another scenario, it may very well be so that the cell borders in E-UTRAN and GERAN/UTRAN are different.

It is also important to understand that the MSC 991 and the SGSN1 1192 are configured with information for Location Based services about the locations of the GERAN/UTRAN cells. For example when a mobile terminal is located in a GERAN cell c3 1103, the BSC1*a* 1121 indicates the GSM-CGI of that cell to the MSC 991 and then the MSC 991 can have logic based on this to provide location based services. The current invention is related to the CSoLTEvGAN solutions and therefore the SGSN part is not further described.

It is also important to briefly look back to FIG. 9 which shows that in the CSoLTEvGAN solution, the GAN selects a GAN-CGI (or GAN-SAI) for example for each E-UTRAN cell e1-e12 9201-9212. The embodiments combine the principles of FIGS. 9 and 11 i.e. that the GAN-CGI (or GAN-SAI) for an E-UTRAN cell e1-e12 9201-9212 is selected based on the overlaying GERAN/UTRAN cell c1-c12 9101-9112 and by reusing the configurations already performed in the MSC 991 as much as possible.

This means that the GANC 910 learns both the current E-UTRAN cell e1-e12 9201-9212 of the mobile terminal 901 and the overlaying GERAN/UTRAN cells c1-c12 9101-9112 and uses this information to automatically build the needed cell relations and then use these cell relations to select the correct GAN-CGI or GAN-SAI to indicate towards the MSC 991.

There are also some principal differences in how the GANC 910 may select the GAN-CGI or GAN-SAI. There is also one more additional aspect in how the GANC 910 can select the GAN-CGIs (and GAN-SAIs) depending on how the GANC 910 is connected to the MSCs 991 in the circuit switched core network 990. These aspects are described below.

In the GSM/GERAN case, the CGI of the cells c1-c12 1101-1112 is broadcasted in cell system information and the same CGI is used towards the MSCs 991 (and configured in the MSCs 991). This means that in the GAN A/Gb mode case in the CSoLTEvGAN solution the GAN-CGI used towards the MSC 991 can in some cases be the CGI of the overlaying GERAN cell c1-c4 1101-1104 i.e. once the GANC 910 has learnt the cell relations between E-UTRAN cells e1-e4 9201-9204 and GERAN cells c1-c4 1101-1104.

The WCDMA/UTRAN case is somewhat different. In this case, a cell identity is also broadcasted in the cell system information. However, the cell identity is never indicated to the core network 990 and instead a concept called Service Area, SA is used. Each cell belongs to a Service Area and is configured with a Service Area Identity (SAI). When a mobile terminal 901 accesses a cell, the SAI of the cell is indicated to the MSC 910. However, the SAI is not broadcasted in the cell system information. This means that when the GANC 910 in the GAN Iu mode case in the CSoLTEvGAN solution learns the relations between E-UTRAN cells e5-e8 9205-9208 and UTRAN cells c5-c8 1105-1108, it also needs assistance from an O&M system 1330 to automatically learn the SAIs of the UTRAN cells c5-c8 1105-1108. The GAN-SAI used towards the MSC 991 can then in some cases be the SAI of the overlaying UTRAN cell c5-c8 1105-1108.

The final complexity is how the GANC 910 is connected to the MSCs in the circuit switched core network 990. If the GANC 910 is connected to the same MSC 991 as for example the BSC/RNC 1121-1123 serving the overlaying GERAN/UTRAN cells c1-c12 1101-1112, then the GANC 910 can indicate the same CGI or SAI towards the MSC 991 that would be indicated by the BSC/RNC 1121-1123 if the mobile terminal 901 would be located in any of the overlaying GERAN/UTRAN cells c1-c12 1101-1112. This is also the assumed scenario i.e. that the GANC 910 can be connected to for example all the MSCs in the network or that there exists a GANC towards each MSC and the GANC 910 performs redirection to the correct GANC as needed.

However, if the GANC 910 is not connected to the same MSC as the BSC/RNC serving the overlaying GERAN/UTRAN cell, then an additional configuration is needed in the network. This part is not easily automatic either and it is assumed that in this case there exists an additional mapping for example in the O&M system 1330 that the GANC 910 can use. For example, assume that the BSC1*a* 1121 serving the overlaying GERAN cell c3 1103 is connected to the MSC 991 and this cell has GSM-CGI-57. The GANC 910 is on the other hand connected to a second MSC (not shown in FIG. 9 or 11) and the mobile terminal 901 is placed in an E-UTRAN cell e3 9203 that the GERAN cell c3 1103 with GSM-CGI-57 is overlaying. Once the GANC 910 has learnt the relation between the E-UTRAN cell e3 9203 and the GERAN cell c3 1103, it also finds out that it is not connected to the first MSC 991 and knows that it needs to find an additional mapping from the O&M system 1330. The input keys from the GANC 910 towards the O&M system 1330 in this case are the second MSC and possibly additional MSCs identified by one or more LAIs and the GSM-CGI-57. The O&M system 1330 returns another GSM-CGI, for example GSM-CGI-345, and the GANC 910 knows that it can use this CGI towards the second MSC when mobile terminals are placed in the E-UTRAN cell e3 9203 that is overlaid by the GERAN cell c3 1103 with GSM-CGI-57.

Another alternative is that each GANC is configured with a range of overlaying GERAN/UTRAN cells that it should handle and information about the different overlaying GERAN/UTRAN cells handled by other GANCs. If a mobile terminal attempts to register to a GANC which is not in control of the range, then it will be forwarded to a GANC that is in control of the range.

The embodiments described below are limited to the case when the GANC 910 is connected to the same MSC 991 as the BSC/RNC 1121-1123 serving any of the overlaying GERAN/UTRAN cells c1-c12 1101-1112. However, it is important to remember that all the embodiments can also be extended as above to support the case when the GANC 910 is not connected to the same MSC as the BSC/RNC 1121-1123 serving the overlaying GERAN/UTRAN cells c1-c12 1101-1112.

In a first embodiment the mobile terminal 901 includes the relations it knows about between E-UTRAN cells and the overlaying GERAN/UTRAN cells, e.g. the mobile terminal 901 reports the cells it can hear, or camped on before entering E-UTRAN coverage or possible based on IRAT cell neighbor lists received, irrespectively of radio access technology. The GANC 910 builds the needed cell relations based on the received information. For example for GERAN cells c1-c4 1101-1104, the GANC 910 knows that it can use the CGI reported from the mobile terminal 901 towards the MSC 991 to indicate the location of the mobile terminal 901. For overlaying UTRAN cells c5-c8 1105-1108, the GANC 910 performs the logic described above to retrieve the SAI to be used towards the MSC 991. As the GANC 910 receives more information from the mobile terminals, it continues building the needed relations between E-UTRAN and GERAN/UTRAN cells and can use this information for all mobile terminals accessing the GANC 910. With this solution, the GANC 910 may receive the same information for an E-UTRAN cell multiple times. The mobile terminal reports the known relations between E-UTRAN and GERAN/UTRAN cells in signaling messages such as control plane messages during GAN registration, registration update or GAN signaling connection establishment.

A second embodiment or an optional addition to the first embodiment includes extensions to the GAN signaling between the GANC 910 and the mobile terminal 901. These extensions comprise the possibility for the GANC 910 to ask the mobile terminal 901 about information for overlaying GERAN/UTRAN cells for a specific E-UTRAN cell in a similar way as for the Automatic Neighbor Relation (ANR) detection in E-UTRAN.

In this way the GANC 910 can limit the information it receives to only the information that is really needed. It is also possible that the GANC 910 asks the mobile terminal 901 about information for another E-UTRAN cell than the current serving cell.

In a third embodiment the O&M system 1330 is aware of the IRAT neighbors for E-UTRAN cells e1-e12 9201-9212 as these have been learnt using ANR principles. The GANC 910 asks the O&M system 1330 for this information and builds the needed cell relation table 1000.

In a fourth embodiment the GANC 910 asks the MME 930 to return the IRAT neighbors for an E-UTRAN cell. The MME 930 has this information or asks the serving eNodeB eNB1a-eNB1c 921-923 for this information. This request from the GANC 910 could be combined with a network provided location information support e.g. when the GANC 910 asks the MME 930 about the current serving E-UTRAN cell.

In a fifth embodiment the main principle is that the GANC 910 learns the relations between E-UTRAN cells and GERAN/UTRAN cells based on handover signaling it handles. For example, if the SRVCC handover principles are used to move the mobile terminal 901 from the CSoLTEv-GAN solution to the GERAN/UTRAN, then the GANC 910 can build the relations between the source E-UTRAN cells and the target GERAN/UTRAN cells by analyzing the handover signaling it handles between the MME 930 and the target BSC/RNC. In a similar way, the GANC 910 can analyze the handover signaling for the handover direction from GERAN/UTRAN to CSoLTEvGAN i.e. to learn the relations between source GERAN/UTRAN and target E-UTRAN cells.

In a sixth embodiment the GANC 910 is adapted and configured to perform different algorithms to retrieve the GAN-CGI and GAN-SAI automatically from the information about the E-UTRAN cell e1_e12 9201-9212 reported by the mobile terminal 901 to the GANC 910. The identifiers used for E-UTRAN cells, the GAN-CGIs and GAN-SAIs are described below. First the format of these identifiers is described and then some examples are given on how an algorithm mapping between identifiers could be performed.

The mobile terminal 901 reports the TAI and the ECGI of the current E-UTRAN cell e3 9203 to the GANC 910. The TAI consists of Mobile Country Code (MCC), Mobile Network Code (MNC) and a Tracking Area Code (TAC). The MCC and the MNC together is also known as the Public Land Mobile Network (PLMN) code. MCC consists of 3 digits, MNC consists of 2 or 3 digits and the TAC is a 16-bit integer/field.

The ECGI is constructed from the MCC, MNC and the ECI (E-UTRAN Cell Identifier). Furthermore, the ECI is used to identify cells within a PLMN. ECI has a length of 28 bits and contains an eNodeB Identifier (eNB-ID) and a cell identifier.

The eNB-ID can have different lengths, e.g. 20 bits leaving 8 bits to identify different cells in that eNodeB.

A GAN-CGI consists of a Location Area Identity (LAI) and a Cell Identity (CI). Furthermore, the LAI consists of MCC, MNC and Location Area Code (LAC). MCC and MNC are of the same format as defined above in relation to TAI and the LAC is a 16-bit integer/field.

A GAN-SAI consists of a LAI and a Service Area Code (SAC). LAI is as defined above and the SAC is a 16-bit integer/field.

To summarize, the mobile terminal 901 may report the following information about an E-UTRAN cell for example the cell e3 9203:
  a MCC, 3 digits
  b MNC, 2 or 3 digits
  c TAC, 16 bits
  d ECI, 28 bits Also to summarize, the GANC 910 needs to report the following information to the MSC 991 in the core network 990:
  GAN-CGI:
  MCC, 3 digits
  MNC, 2 or 3 digits
  LAC, 16 bits
  CI, 16 bits
  GAN-SAI:
  MCC, 3 digits
  MNC, 2 or 3 digits
  LAC, 16 bits
  SAC, 16 bits The algorithm would map automatically between the E-UTRAN cell information and the GAN-CGI/GAN-SAI. The basic principle is that at least one portion (all or parts) of the cell identification information related to the E-UTRAN cell 9201 is used to construct at least one portion of the cell identification information GAN-CGI/GAN-SAI for the GAN cell 9101.

Some example on mappings/translations that could be used are found below:
  Example 1 to build a GAN-CGI:
  MCC and MNC of the E-UTRAN cell are used unmodified
    as the MCC and MNC of the GAN-CGI.
  The 28-bits ECI is used to construct both the
  LAC and CI. For example, the high 12 bits of the ECI are used as the LAC and the 16 low bits of the ECI are used as the CI.
  Example 2 to build a GAN-SAI:
  MCC and MNC of the E-UTRAN cell are used unmodified
    as the MCC and MNC of the GAN-SAI.
  The 28-bits ECI is used to construct both the LAC and CI.
    For example, the high 12 bits of the ECI are used as the
    LAC and the 16 low bits of the ECI are used as the CI.
  Example 3 to build a GAN-CGI:
  MCC and MNC of the E-UTRAN cell are used unmodified
    as the MCC and MNC of the GAN-CGI.
  The 16 bits TAC is used to construct the LAC, for example
    unmodified.
  The 28-bits ECI is used to construct both the CI. For
    example, only the 16 low bits of the ECI are used as the
    CI.

In some other examples also the MCC and/or MNC could be mapped, for example so that the MCC is kept but the MNC is set to a default value in the GANC.

It is also possible that other mathematical functions are applied. The translation of the portion of the E-UTRAN cell identification information can for example include a hash algorithm in order to construct a portion of the cell identification information GAN-CGI/GAN-SAI for the GAN cell.

The described principles in this embodiment can also be used for the translation of GERAN and UTRAN cell identification information to GAN-CGI and GAN-SAI in case the mobile terminal 901 provides this information to the GANC 910.

Figure 12:
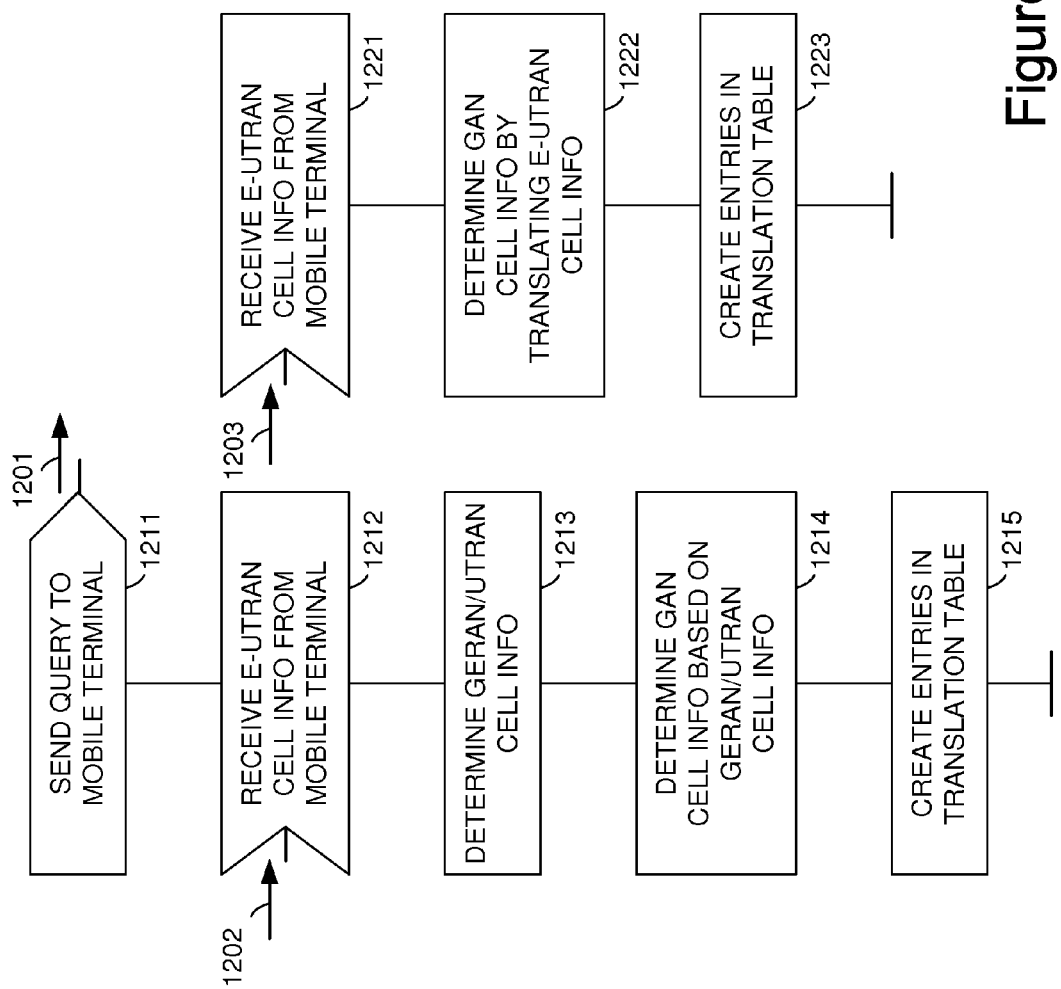
FIG. 12 is a flow chart illustrating embodiments of the method to automatically configure cell relations according to the current invention.

The embodiments of the method to automatically configure the relations between the E-UTRAN cell identification information (CGIs/TAIs) and the GAN cell identification information (GAN-CGI/GAN-SAI) in the GANC 910 are also illustrated by the flow chart in FIG. 12.

In one embodiment the GANC 910 can optionally in step 1211 send a signaling message 1201 to the mobile terminal 901 comprising an explicit query for cell identification information.

Cell identification information for example for the E-UTRAN cell e3 9203 is received in step 1212 from the mobile terminal 901 in a signaling message 1202 being either a response to the query 1201 or an unsolicited signaling message.

Cell identification information for the GERAN or UTRAN cell c3 1103 overlaying the E-UTRAN cell e3 9203 is determined in step 1213. This can be done either by receiving the information in a signaling message from the mobile terminal 901 (requested or solicited) or by interrogating the MME 930 or the O&M unit 1330. After receiving the cell identification information for the E-UTRAN cell e3 9203 and the GERAN or UTRAN cell c3 1103, the cell identification information for the GAN cell c3 9103 is determined in step 1214. This is based on the received cell identification information for the GERAN or UTRAN cell c3 1103 overlaying the E-UTRAN cell e3 9203.

After the cell identification information for the GAN cell c3 9103 has been determined, an entry within the translation table 1000 is created in step 1215 so that the cell identification information for the E-UTRAN cell e3 9203 can be mapped to the cell identification information for the GAN cell c3 9103, or vice versa. This mapping can then be used by further signaling messages such as control plane messages.

In another embodiment, the cell identification information for an E-UTRAN cell e1 9201 is received in step 1221 in a signaling message 1203 from the mobile terminal 901 in the same way as above. A difference is that the GANC 910 determines in step 1222 the cell identification information for the GAN cell c1 9101 by translating or mapping at least one portion of the E-UTRAN cell identification information to at least one portion of a GAN cell identification information. The different variants of translations/mappings are described above. The entry within the translation table 1000 is created in step 1223 in the same way as described above.

Figure 13:
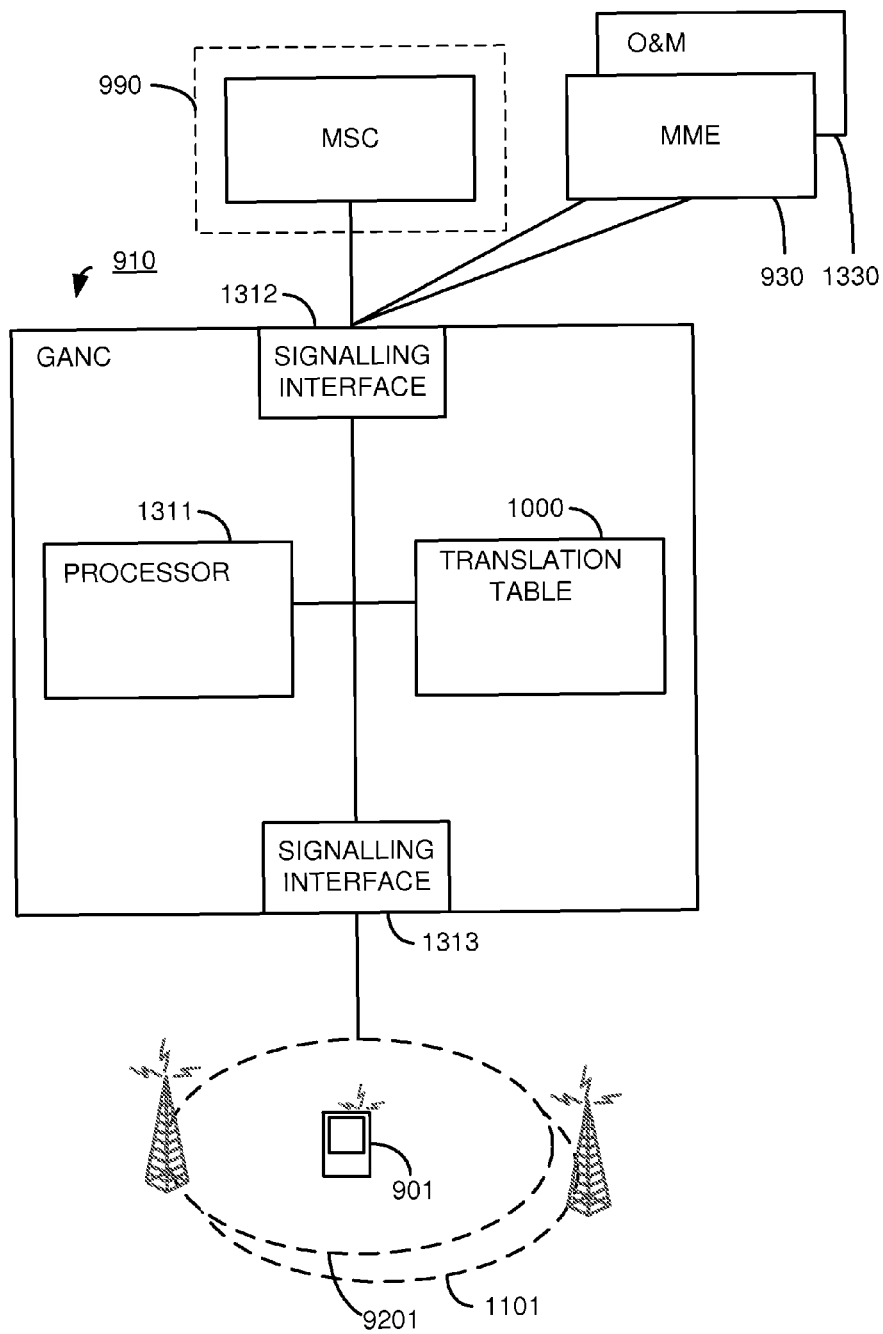
FIG. 13 is a block diagram illustrating a GANC adapted according to the current invention.

The invention also comprises a GANC 910 that is adapted to execute the embodiments of the method described above. An embodiment of this GANC 910 is illustrated in FIG. 13. The GANC 910 comprises a processor 1311, a translation table 1000 and two signaling interfaces 1312, 1313 coupled to the processor 1311 and adapted to communicate with the core network 990 and at least one mobile terminal 901 respectively. The signaling interface 1312 is also adapted to communicate with an MME 930 and/or an O&M unit 1330.

In a first embodiment, the processor 1311 is adapted to receive via the signaling interface 1313 a signaling message 1202 comprising cell identification information for an E-UTRAN cell e3 9203 from the mobile terminal 901. The processor 1311 is further adapted to determine cell identification information for a cell c3 1103 in the GERAN or UTRAN overlaying the E-UTRAN cell e3 9203 either by receiving the information from the mobile terminal 901 or from any of the MME 930 or the O&M unit 1330. The processor 1311 is further adapted to determine cell identification information for a cell c3 9103 in the GAN based on the cell identification information for the overlaying cell(s) c3 1103 in the GERAN or UTRAN and to create an entry within the translation table 1000 so that the cell identification information for the E-UTRAN cell e3 9203 can be mapped to the cell identification information for the GAN cell c3 9103, or vice versa.

In a second embodiment the processor 1311 is adapted to receive via the signaling interface 1313 cell identification information for the E-UTRAN cell e3 9203 in a signaling message 1203 from the mobile terminal 901. The processor 1311 is further adapted to determine cell identification information for the GAN cell c1 9101 by translating at least one portion of the E-UTRAN cell identification information to at least one portion of the GAN cell identification information and to create an entry within the translation table 1000 so that the cell identification information for the E-UTRAN cell e3 9203 can be mapped to the cell identification information for the GAN cell c3 9103, or vice versa.

A person skilled in the art would recognize that the CSoLTEvGAN architecture referred to in this description and related claims corresponds to the architecture disclosed in publications by the wireless industry initiative VoLGA Forum (VoLGA=Voice over LTE via Generic Access). The same person would also recognize that the GANC corresponds to the later term VANC (VoLGA Access Network Controller).

The invention claimed is:

1. A method to configure relations between Evolved Universal Terrestrial Radio Access Network (E-UTRAN) cells and Generic Access Network (GAN) cells in a generic access node controller (GANC) in a Circuit Switched Services over Long Term Evolution via Generic Access Network (CSoLTEvGAN) architecture, said method comprising:
    receiving, in a signaling message, cell identification information for an E-UTRAN cell from a mobile terminal;
    determining cell identification information for a GAN cell by translating at least one portion of the cell identification information for the E-UTRAN cell to at least one portion of the cell identification information for the GAN cell;
    creating an entry within a translation table the to map cell identification information for the E-UTRAN cell to the determined cell identification information for the GAN cell, or to map the determined cell identification information for the GAN cell to the cell identification for the E-UTRAN cell;
    copying the values of a Mobile Country Code (MCC) and a Mobile Network Code (MNC) in the cell identification information for the E-UTRAN cell to the values of an MCC and MNC in the cell identification information for the GAN cell;
    copying the 12 most significant bits of an E-UTRAN Cell Identifier (ECI) are copied to the 12 least significant bits of a Location Area Code (LAC) in the cell identification information for the GAN cell; and
    copying the 16 least significant bits of the ECI to a Cell Identity/Service Area Code (CI/SAC) in the cell identification information for the GAN cell.

2. The method as in claim 1 wherein translating at least one portion of the cell identification information comprises translating at least one portion of the cell identification information for the E-UTRAN cell using a hash algorithm.

3. A method to configure relations between Evolved Universal Terrestrial Radio Access Network (E-UTRAN) cells and Generic Access Network (GAN) cells in a generic access node controller (GANC) in a Circuit Switched Services over Long Term Evolution via Generic Access Network (CSoLTEvGAN) architecture, said method comprising:
receiving, in a signaling message, cell identification information for an E-UTRAN cell from a mobile terminal;
determining cell identification information for a GAN cell by translating at least one portion of the cell identification information for the E-UTRAN cell to at least one portion of the cell identification information for the GAN cell;
creating an entry within a translation table the to map cell identification information for the E-UTRAN cell to the determined cell identification information for the GAN cell, or to map the determined cell identification information for the GAN cell to the cell identification for the E-UTRAN cell;
copying the values of a Mobile Country Code (MCC) and a Mobile Network Code (MNC) in the cell identification information for the E-UTRAN cell to the values of a MCC and MNC in the cell identification information for the GAN cell;
copying the value an E-UTRAN Tracking Area Code (TAC) to the Location Area Code (LAC) in the cell identification information for the GAN cell; and
mapping the 16 least significant bits of the E-UTRAN Cell Identifier (ECI) to a Cell Identity/Service Area Code (CI/SAC) in the cell identification information for the GAN cell.

4. A Generic Access Node Controller (GANC) in a Circuit Switched Services over Long Term Evolution using Generic Access Network (CSoLTEvGAN) architecture comprising:
a processor;
a translation table; and
at least one signaling interface coupled to the processor and adapted to communicate with a core network and a mobile terminal in an Evolved Universal Terrestrial Radio Access Network (E-UTRAN);
wherein the processor is configured to:
receive, via the at least one signaling interface, cell identification information for an E-UTRAN cell in a signaling message from the mobile terminal;
determine cell identification information for a Generic Access Network (GAN) cell by translating at least one portion of the cell identification information for the E-UTRAN cell to at least one portion of the cell identification information for the GAN cell;
create an entry within the translation table so that the cell identification information for the E-UTRAN cell maps to the cell identification information for the GAN cell, or so that the cell identification information for the GAN cell maps to the cell identification information for the E-UTRAN cell;
copy the values of a Mobile Country Code (MCC) and a Mobile Network Code (MNC) in the cell identification information for the E-UTRAN cell to the values of an MCC and MNC in the cell identification information for the GAN cell;
copy the 12 most significant bits of an E-UTRAN Cell Identifier (ECI) are copied to the 12 least significant bits of a Location Area Code (LAC) in the cell identification information for the GAN cell; and
copy the 16 least significant bits of the ECI to a Cell Identity/Service Area Code (CI/SAC) in the cell identification information for the GAN cell.

5. A Generic Access Node Controller (GANC) in a Circuit Switched Services over Long Term Evolution using Generic Access Network (CSoLTEvGAN) architecture comprising:
a processor;
a translation table; and
at least one signaling interface coupled to the processor and adapted to communicate with a core network and a mobile terminal in an Evolved Universal Terrestrial Radio Access Network (E-UTRAN);
wherein the processor is configured to:
receive, via the at least one signaling interface, cell identification information for an E-UTRAN cell in a signaling message from the mobile terminal;
determine cell identification information for a Generic Access Network (GAN) cell by translating at least one portion of the cell identification information for the E-UTRAN cell to at least one portion of the cell identification information for the GAN cell;
create an entry within the translation table so that the cell identification information for the E-UTRAN cell maps to the cell identification information for the GAN cell, or so that the cell identification information for the GAN cell maps to the cell identification information for the E-UTRAN cell;
copy the values of a Mobile Country Code (MCC) and a Mobile Network Code (MNC) in the cell identification information for the E-UTRAN cell to the values of a MCC and MNC in the cell identification information for the GAN cell;
copy the value an E-UTRAN Tracking Area Code (TAC) to the Location Area Code (LAC) in the cell identification information for the GAN cell; and
map the 16 least significant bits of the E-UTRAN Cell Identifier (ECI) to a Cell Identity/Service Area Code (CI/SAC) in the cell identification information for the GAN cell.

* * * * *